C. B. GRAY.
MACHINE FOR CUTTING SHEET FORM MATERIAL.
APPLICATION FILED FEB. 9, 1917.

1,383,618.

Patented July 5, 1921.
4 SHEETS—SHEET 1.

Inventor
Charles B. Gray,
By Cyrus Kehr,
Attorney

C. B. GRAY.
MACHINE FOR CUTTING SHEET FORM MATERIAL.
APPLICATION FILED FEB. 9, 1917.
1,383,618.
Patented July 5, 1921.
4 SHEETS—SHEET 2.
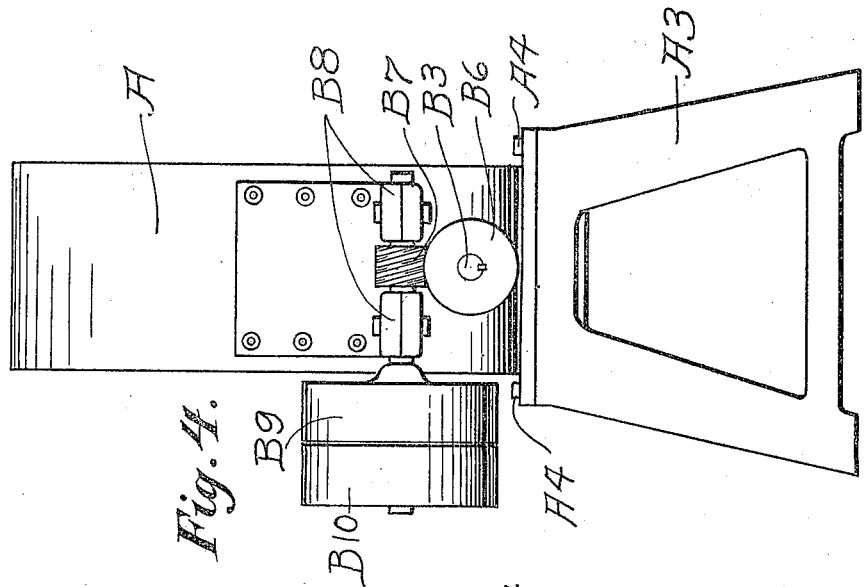
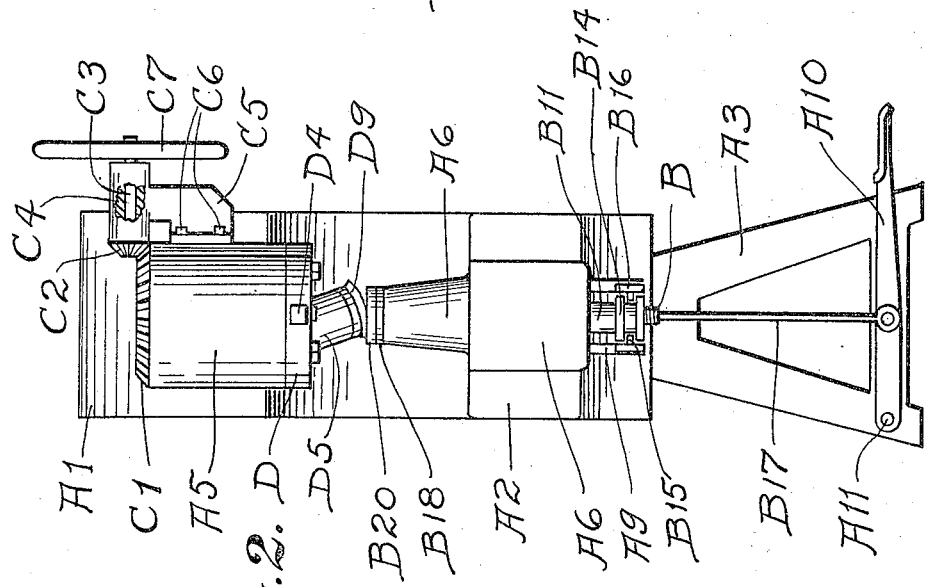
Inventor
Charles B. Gray
By Cyrus Kehr
Attorney

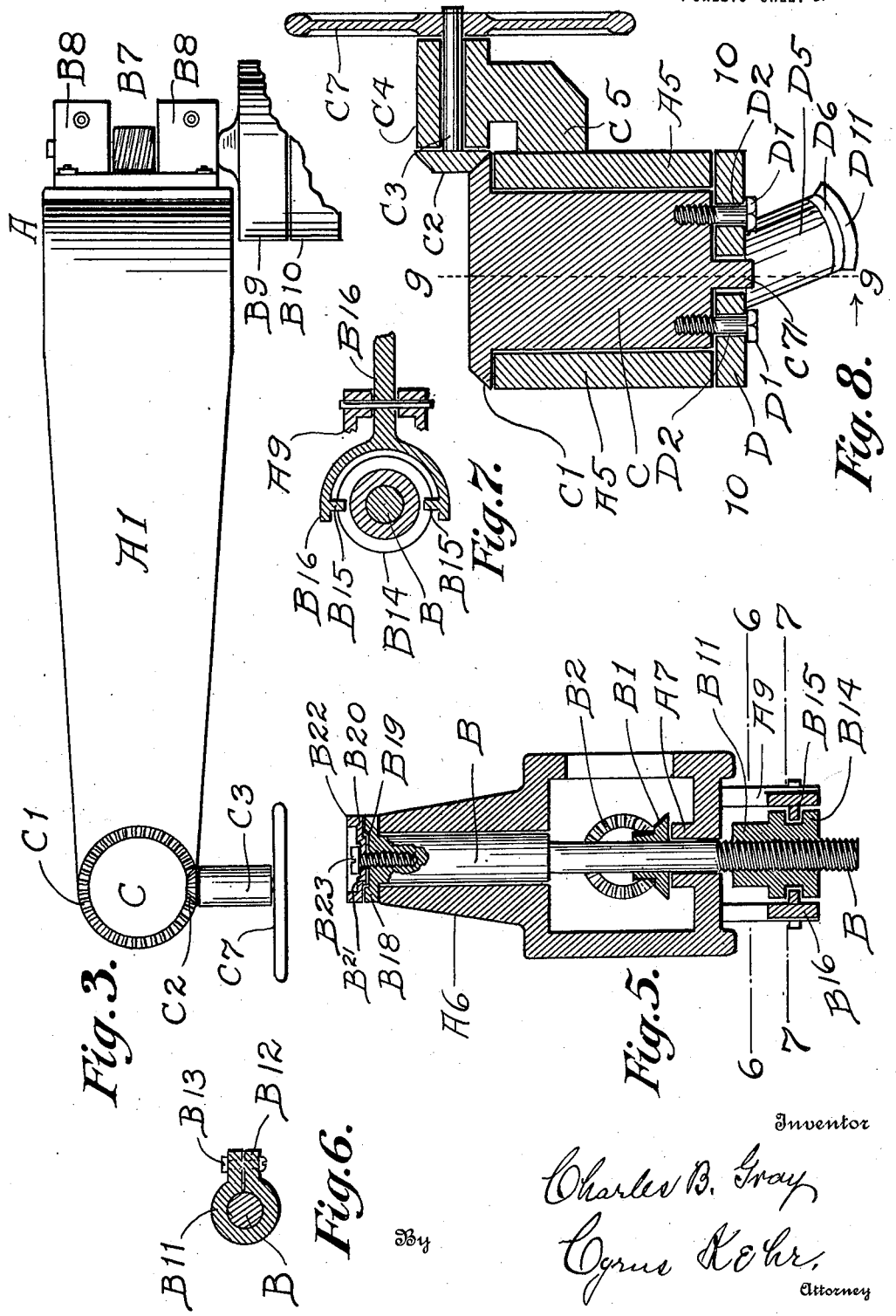

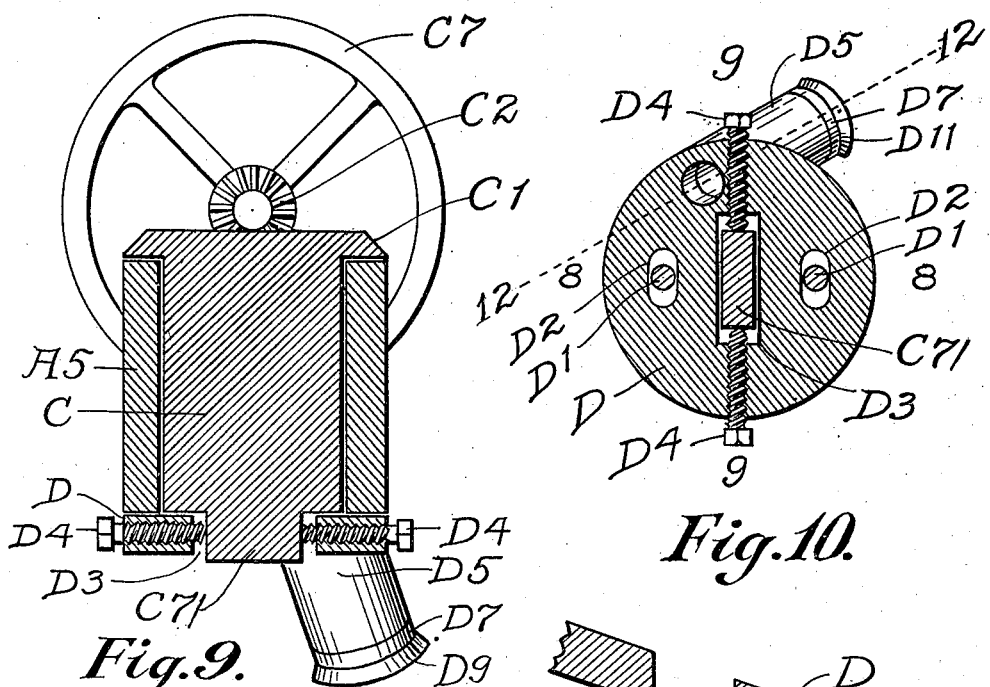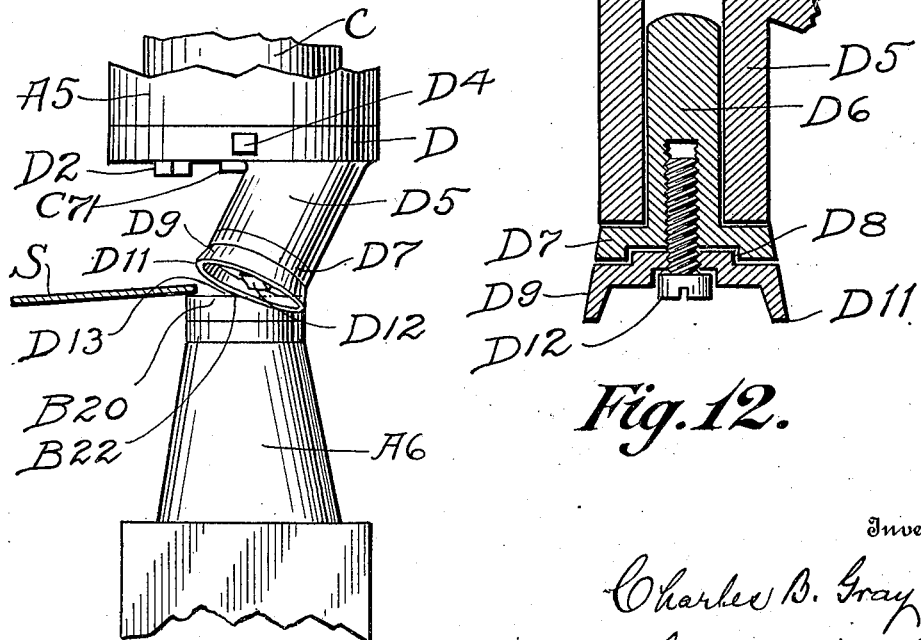

UNITED STATES PATENT OFFICE.

CHARLES BAXTER GRAY, OF PHILADELPHIA, PENNSYLVANIA.

MACHINE FOR CUTTING SHEET-FORM MATERIAL.

1,383,618.     Specification of Letters Patent.     Patented July 5, 1921.

Application filed February 9, 1917. Serial No. 147,700.

*To all whom it may concern:*

Be it known that I, CHARLES BAXTER GRAY, a citizen of the United States, residing at Philadelphia, in the county of Philadelphia and State of Pennsylvania, have invented a new and useful Improvement in Machines for Cutting Sheet-Form Material, of which the following is a specification, reference being had to the accompanying drawing.

My improvement relates particularly to machines for cutting sheet-form material on lines which do not continue in the same direction. The object of the improvement is to provide a machine for rapidly cutting sheets of metal along lines which are curved or angular or change course so frequently as to prevent the use of ordinary shearing machines.

My machine resembles what are now known in the market as rotary shears.

In my improved machine, provision is made for changing the direction of the cut at the will of the operator without turning the sheet horizontally around the point at which the shearing is being done. When the direction of cutting and the direction of feed have been thus changed, the sheet is still free to be turned manually for changing the direction of the cut on the sheet. The course of the cutting may also be varied by simultaneously changing the direction of the feed and turning the sheet manually with the shearing point as an axis. The change in the direction of the feed is to be used when the sheet is so wide or so long as to make it cumbersome for handling or as to prevent its turning through the throat formed between the upper and lower arms of the machine.

In the accompanying drawings,

Fig. 2 is an elevation looking toward the right in Fig. 1;

Fig. 3 is a plan of the machine shown in Fig. 1;

Fig. 4 is an end elevation looking at the machine toward the left in Figs. 1 and 3;

Fig. 5 is an enlarged upright section on the line, 5—5, of Fig. 1;

Fig. 6 is a horizontal section on the line, 6—6, of Figs. 1 and 5;

Fig. 7 is a horizontal section on the line, 7—7, of Fig. 1;

Fig. 8 is an enlarged upright section on the line, 8—8, of Fig. 1, looking toward the right;

Fig. 9 is an upright section on the line, 9—9, of Fig. 8;

Fig. 10 is an enlarged horizontal section on the line, 10—10, of Fig. 1;

Fig. 11 is an elevation of the shearing wheels and their supports, looking toward the left between the arms of the machine body as shown in Fig. 1;

Fig. 12 is a section along the axis of the upper shearing wheel.

Figure 1:
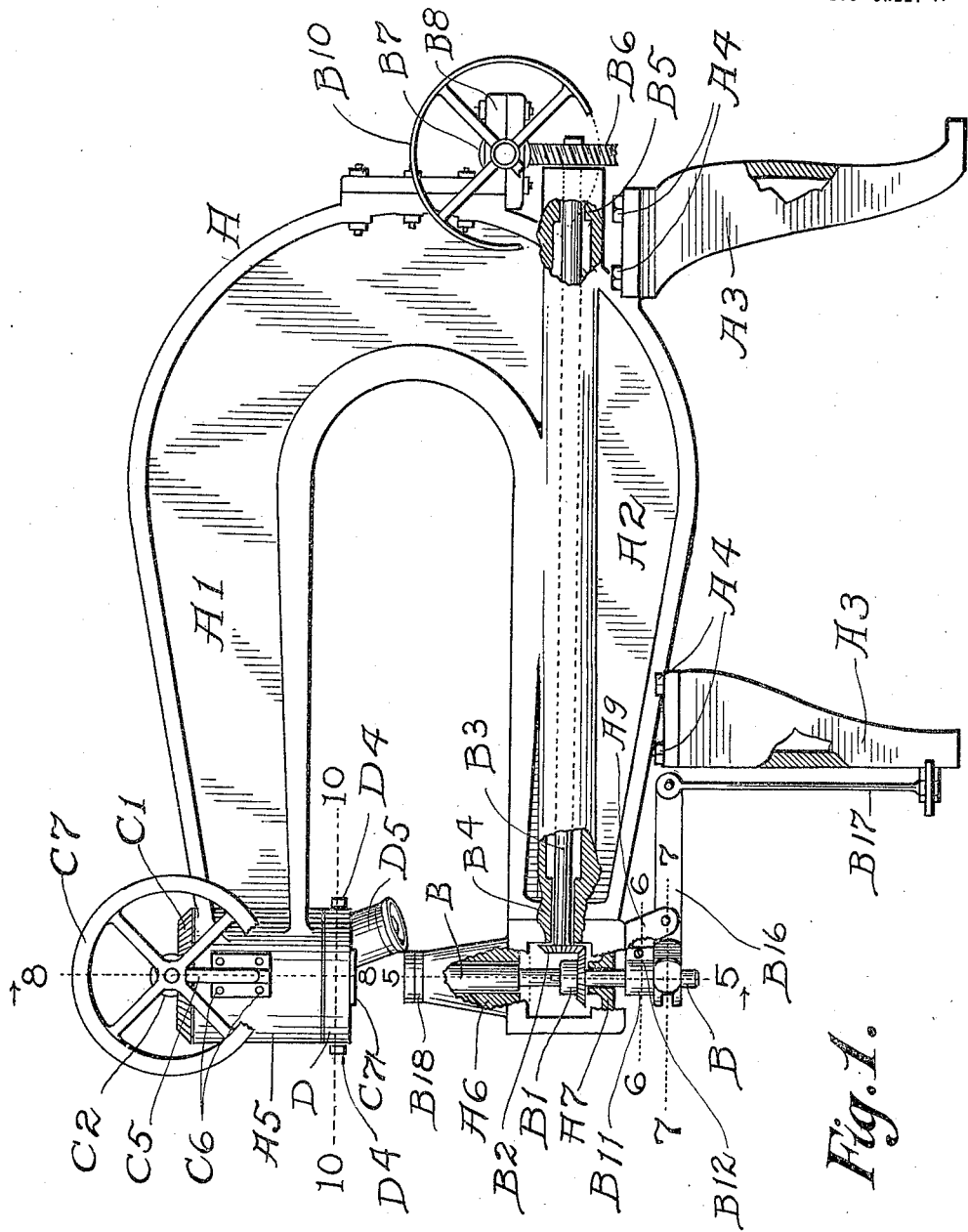
Figure 1 is a front elevation of a machine embodying my improvement, portions being broken away.

Referring to said drawings, A is the body of the machine having the upper arm, $A^1$, and the lower arm, $A^2$, approximately parallel to the arm, $A^1$. Between said arms is the throat. The body, A is supported on standards, $A^3$, secured to the body by bolts, $A^4$. On the outer end of the upper arm is an upright bearing, $A^5$. On the outer end of the lower arm are an upper bearing, $A^6$, and a lower bearing, $A^7$, in axial alinement with the bearing, $A^5$.

In the bearings, $A^6$ and $A^7$, is an upright rotary shaft, B, which extends even with the upper end of the bearing, $A^6$, and below the lower end of said bearing.

Between the bearings, $A^6$ and $A^7$, is a chamber, $A^8$, surrounding the shaft, B, and within said chamber a bevel gear wheel, $B^1$, surrounds said shaft and is secured thereon so as to permit endwise movement of said shaft while the gear wheel, $B^1$, rests upon the upper end of the bearing, $A^7$. Said bevel gear wheel meshes with the bevel gear wheel, $B^2$, keyed on the horizontal drive shaft, $B^3$, which extends through the lower arm, $A^2$, and is supported in a bearing, $B^4$, adjacent the bevel wheel, $B^2$, and in a bearing, $B^5$, in the right hand portion of the body, A. The right hand end of said shaft extends through said bearing and is surrounded and keyed to a worm gear wheel, $B^6$, which meshes with a horizontal worm, $B^7$, having its shaft resting in bearings, $B^8$. On said shaft are a loose pulley, $B^9$, and a fixed pulley, $B^{10}$. A belt (not shown) applies power to the fixed pulley, and from the latter motion is transmitted through the worm, the worm wheel, the drive shaft, and the bevel gears, $B^2$ and $B^1$, to the upright shaft, B.

Below the bearing, $A^7$, the shaft, B, is screw threaded and surrounded by a split nut, $B^{11}$. At opposite sides of the cut the nut has ears, $B^{12}$. A screw, $B^{13}$, extends transversely and horizontally through said ears for drawing the latter together to bind said nut upon said shaft so firmly as to prevent the turning of the nut during the operation of the machine.

Below said ears, said nut has two annular flanges, $B^{14}$, into which extend fingers, $B^{15}$, on a fork, $B^{16}$, which spans said nut and is hinged on a horizontal axis between ears, $A^9$, extending downward from the adjacent portion of the arm, $A^2$. The long arm of said fork extends toward the right below the arm, $A^2$, nearly to the adjacent standard, $A^3$, and is there coupled to the upper end of an upright link, $B^{17}$. The lower end of said link is coupled to a pedal bar, $A^{10}$, the rear end of which is coupled to the standard, $A^3$, at $A^{11}$. By depressing the pedal bar, the fork, $B^{16}$, is tilted and made to press upward on the nut, $B^{11}$. By adjusting the height of the nut on the shaft, B, the height to which said shaft may be raised is varied, such height being limited by the lower end of the lower bearing, $A^7$.

On the upper end of said shaft, B, and in axial alinement therewith is a disk-form head, $B^{18}$, which is integral with or firmly attached to said shaft. In the upper face of said head is an annular recess, $B^{19}$. The lower shear wheel, $B^{20}$, has an annular boss or downward extension, $B^{21}$, which fits into the recess, $B^{19}$. Along the periphery of said wheel is an upright annular flange, $B^{22}$, the upper face of which is approximately horizontal and roughened to facilitate engagement with the lower face of a piece of sheet metal which is to be sheared. A screw bolt, $B^{23}$, extends downward through said wheel into the shaft, B, and firmly binds said shearing wheel to the head, $B^{18}$. Said head and said shearing wheel are preferably made of the same diameter, as shown by the drawing.

The shearing wheel, $B^{20}$, works in conjunction with the upper shearing wheel, which will be next described.

In the upper bearing, $A^5$, is the journal-form turret body, C, having its lower end even with the lower end of said bearing. On the upper end of said body is a bevel gear, $C^1$, of larger diameter than said body and resting upon the upper end of the bearing, $B^5$, and meshing with a smaller bevel gear wheel, $C^2$, on a shaft, $C^3$, resting in the horizontal bearing, $C^4$, which forms a part of a bracket, $C^5$, which is secured to the side of the bearing, $A^5$, by means of bolts, $C^6$. On the outer end of the shaft, $C^3$, is a hand wheel, $C^7$, by means of which the operator may rotate the shaft, $C^3$. The rotation of said shaft involves the rotation of the bevel gear wheels, $C^2$ and $C^1$, and the turret body, C. The hand wheel and said gears are so proportioned as to cause a given movement of the hand wheel to impart a lesser movement to the turret body.

On the lower end of the turret body and on the axial line thereof is a downward-directed boss, $C^{71}$, having parallel, upright sides.

A circular base plate, D, is secured to the lower end of the turret body by means of binding bolts, $D^1$, extending upward through elongated apertures, $D^2$, in the base plate, and into said body. Said plate has an elongated upright slot, $D^3$, into which the boss, $C^7$, extends, said slot being narrow enough to permit guiding said plate during horizontal movement in the direction parallel to the sides of said boss. Said plate may be thus shifted horizontally when the binding bolts have been released. At each end of the slot, $D^3$, a set bolt, $D^4$, extends horizontally through the base plate into said slot in position to bear against the boss. When the binding bolts have been loosened, the said bolts are adjusted to force the base plate horizontally into the precise position required for accurate setting of the upper shearing wheel with reference to the lower shearing wheel. Then the binding bolts are again tightened.

The turret body, C, the gear, $C^1$, and the base plate, D, together constitute a turret for the support of the upper shearing wheel.

On one edge of the base plate and integral therewith and at one side of the slot, $D^3$, is a barrel, $D^5$, in which rests the shaft or journal, $D^6$, of the upper shearing wheel.

On the lower end of said shaft is a disk-form head which is integral with or firmly attached to said shaft. In the lower face of said head is an annular recess, $D^8$. Said wheel has a downward-directed flange, $D^{11}$, which meets the upward-directed flange, $B^{22}$, of the lower shearing wheel, $B^{20}$. A binding bolt, $D^{12}$, extends upward through the wheel, $D^9$, into the head, $D^7$, and the shaft, $D^6$, to bind said wheel firmly to said head. Said wheel is preferably made frusto-conical, as shown by the drawing.

Both shearing wheels are preferably made separately from their heads as shown, in order that said wheels may be tempered separately and in order that one wheel may be substituted for another without also substituting the adjacent head and shaft.

The shaft, $D^6$, is free to rotate in the barrel, $D^5$. This gives the shearing wheel, $D^9$, rotation on its own axis—the axial line of said shaft. Said shearing wheel has a second motion, namely: a planetary or orbital movement around the axis of the turret body, said axis being also the axial line of the lower shaft, B.

The barrel, $D^5$, is far enough from said axial line to bring the upper shearing wheel beside the lower shearing wheel, the edges of the knives merely touching in a common point.

The axial line of the shaft, $D^6$, is in a plane which cuts diagonally the axial line of the turret body, whereby the upper shearing wheel becomes tilted, the portion which is the farther from the lower shearing wheel being the higher, and whereby the plane of the lower face of the upper shearing wheel obliquely cuts the plane of the lower shearing wheel. In this manner, the meeting edges of the shearing wheels are set into inter-engagement and position suitable for shearing. In this manner, an opening, $D^{13}$, is presented for the introduction of a sheet, S, of material to be cut. (See Fig. 11.)

Since the lower shaft, B, and the turret body are on the same axial line, and since the edge of the lower shearing wheel is circular and concentric to said axial line and since the upper knife may be moved through an orbit which is concentric to said axial line, it follows that the above-described engagement between the two shearing wheels will be retained regardless of the position which the upper shearing wheel occupies in its orbital path.

It will be observed that the second shearing wheel is made to move bodily to different points in a path which is concentric to the axis of the first shearing wheel, and that said second wheel is supported for rotation on an axis which is tangential and diagonal to an imaginary cylinder formed on the axis of the first shearing wheel.

The shearing wheels also serve as feed wheels for the sheet to be cut, the lower wheel being the positive feed element.

In operation, the turret is turned into position to bring the upper shearing wheel into the portion of its path which will cause the two shearing wheels to make a cut in the desired direction. When, for example, the upper shearing wheel is set toward the right, as shown in Fig. 1, the cut will be on a line which is perpendicular to the upright plane of the arms $A^1$ and $A^2$. If said upper wheel is placed at the opposite side of the lower shearing wheel, the cut will be on a line parallel to the line already mentioned, but the direction of the feed of the sheet will be reversed. By placing the upper wheel at the front or at the rear of the lower shearing wheel, the direction of the cut will be parallel to said plane and at right-angles to said lines. If the upper wheel is set intermediate any two of the four positions mentioned above, the direction of the cut will be diagonal to said plane and said two parallel lines.

The direction of the cut is dependent upon the direction of the feed, and the direction of the feed changes with the change of position of the upper shearing wheel.

If a sheet of material which is to be cut is so long as to make it inconvenient to turn it in a horizontal plane on the cutting point to change the direction of the cut, the operator turns the hand wheel, $C^7$, to move the upper shearing wheel in its orbit in the appropriate direction and to the necessary extent. Then the feed of the sheet becomes changed accordingly. In many cases, it is convenient to turn the sheet through a limited range while the cutting is proceeding, but not convenient to make a considerable change in the direction of the feed. In such cases, the hand wheel may be turned for changing the general course of feed and the sheet may be turned for effecting limited additional variation in the direction of the feed.

In some cases, a sheet is longer than the throat space. Then the turning of the sheet is much limited. Yet the cut may be made in any desired direction by appropriately moving the upper shearing wheel in its orbit. In this manner small and large circles and curves of various forms may be cut. Angles may also be cut in any desired form.

The space between the split nut, $B^{11}$, and the head, $B^{18}$, on the shaft, B, is made sufficient to allow such endwise movement as will permit the lower shearing wheel to move away from the upper shearing wheel for the insertion of a sheet, and again produce proper inter-engagement between said wheels when the nut, $B^{11}$, is driven upward against the bearing, $A^7$, by the depression of the pedal bar.

The nut, $B^{11}$, permits initial adjustment and subsequent readjustment to compensate for change in the height of wheels through regrinding.

By shifting the base plate horizontally on the turret body, proper initial horizontal relation between the shearing wheels is established; and subsequently horizontal readjustment of the upper shearing wheel may be made to compensate for reduction of diameter of either or both of the wheels through regrinding, the grinding of each wheel being done on its perimeter.

Regarding the peculiar position of the axis of rotation of the upper shearing wheel, it may be further stated that said axis is tangential and oblique to the perimeter of an imaginary cylinder formed with its axis coincident to the axis of the lower shearing wheel.

As already indicated, the sheet to be cut is placed horizontally between the two shearing wheels and is maintained in that position during the shearing operation. The plane in which said sheet rests may be regarded as the sheet plane. It is to be observed that the upper face of the lower shearing wheel is presented flatwise to the shearing plane and that the other shearing wheel is located above said plane and has its edge meeting the edge of the lower shearing wheel in said plane.

I claim as my invention,

1. In a machine of the nature described, the combination of a body, a first shearing wheel supported rotatably by said body, a shearing wheel supporting means supported by said body for rotation relative to said body on an axis which is coincident with the axis of the first shearing wheel, a second shearing wheel supported by said supporting means and having its edge meeting the edge of the first shearing wheel and rotatable on an axis which is non-coincident with the axis of the first shearing wheel, whereby by the rotation of said supporting means the second shearing wheel may be made to move bodily to different points in a path which is concentric to the axis of the first shearing wheel, substantially as described.

2. In a machine of the nature described, the combination of a body, a first shearing wheel supported rotatably by said body, a shearing wheel supporting means supported by said body for rotation relative to said body on an axis which is coincident with the axis of the first shearing wheel, a second shearing wheel supported by said supporting means and having its edge meeting the edge of the first shearing wheel and rotatable on an axis which is non-coincident with the axis of the first shearing wheel, whereby by the rotation of said supporting means the second shearing wheel may be made to move bodily to different points in a path which is concentric to the axis of the first shearing wheel, and means for driving said first shearing wheel, substantially as described.

3. In a machine of the nature described, the combination of a body, a first shearing wheel supported rotatably by said body, a shearing wheel supporting means supported by said body for rotation relative to said body on an axis which is coincident with the axis of the first shearing wheel, a second shearing wheel supported by said supporting means and having its edge meeting the edge of the first shearing wheel and rotatable on an axis which is non-coincident with the axis of the first shearing wheel, whereby by the rotation of said supporting means the second shearing wheel may be made to move bodily to different points in a path which is concentric to the axis of the first shearing wheel, and means controlled by the operator for turning said supporting means, substantially as described.

4. In a machine of the nature described, the combination of a body, a first shearing wheel supported rotatably by said body on an axis which is perpendicular to the sheet plane, a shearing wheel supporting means supported by said body for rotation relative to said body on an axis which is coincident with the axis of the first shearing wheel, a second shearing wheel supported by said supporting means and having its edge meeting the edge of the first shearing wheel and rotatable on an axis which is non-coincident with the axis of the first shearing wheel, whereby by the rotation of said supporting means the second shearing wheel may be made to move bodily to different points in a path which is concentric to the axis of the first shearing wheel, substantially as described.

5. In a machine of the nature described, the combination of a body, a first shearing wheel supported rotatably by said body, a shearing wheel supporting means supported by said body for rotation relative to said body on an axis which is coincident with the axis of the first shearing wheel, a second shearing wheel supported by said supporting means and having its edge meeting the edge of the first shearing wheel and rotatable on an axis which is tangential and diagonal to an imaginary cylinder formed on the axis of the first shearing wheel, whereby by the rotation of said supporting means the second shearing wheel may be made to move bodily to different points in a path which is concentric to the axis of the first shearing wheel, substantially as described.

6. In a machine of the nature described, the combination of a body, a first shearing wheel supported rotatably by said body, a shearing wheel supporting means supported by said body for rotation relative to said body on an axis which is coincident with the axis of the first wheel, a second shearing wheel supported by said supporting means and having its edge meeting the edge of the first shearing wheel and rotatable on an axis which is non-coincident with the axis of the first shearing wheel, whereby by the rotation of said supporting means the second shearing wheel may be made to move bodily to different points in a path which is concentric to the axis of the first shearing wheel, and means for adjusting said wheels relative to each other, substantially as described.

7. In a machine of the nature described, the combination of a body, a first shearing wheel supported rotatably by said body, a shearing wheel supporting means supported by said body for rotation relative to said body on an axis which is coincident with the axis of the first wheel, a second shearing wheel supported by said supporting means and having its edge meeting the edge of the first shearing wheel and rotatable on an axis which is non-coincident with the axis of the first shearing wheel, whereby by the rotation of said supporting means the second shearing wheel may be made to move bodily to different points in a path which is concentric to the axis of the first shearing wheel, and means for adjusting the first of said wheels relative to the second of said wheels, substantially as described.

8. In a machine of the nature described, the combination of a pair of rotary shearing wheels having meeting edges, means supporting and carrying one of said wheels for movement in an orbital path concentric to an axis which is coincident with the axis of the companion wheel and for rotation on an axis which is tangential and diagonal to an imaginary cylinder formed on the axis of said companion wheel, and means for adjusting said wheels relative to each other, substantially as described.

9. In a machine of the nature described, the combination of a body, a first shearing wheel supported rotatably by said body, a shearing wheel supporting means supported by said body for rotation relative to said body on an axis which is coincident with the axis of the first shearing wheel, a second shearing wheel supported by said supporting means and having its edge meeting the edge of the first shearing wheel and rotatable on an axis which is non-coincident with the axis of the first shearing wheel, whereby by the rotation of said supporting means the second shearing wheel may be made to move bodily to different points in a path which is concentric to the axis of the first shearing wheel, means for adjusting the first of said wheels along its axial line, and means for adjusting the second of said wheels bodily toward and from said axial line, substantially as described.

10. In a machine of the nature described, the combination of a pair of rotary shearing wheels having meeting edges, means movable independently of the machine body for supporting and carrying one of said wheels for movement in an orbital path on an axis coincident with the axis of the companion wheel and for rotation on an axis which is tangential and diagonal to an imaginary cylinder formed on the axis of said companion wheel, and means for adjusting said second-mentioned wheel toward and from the axis of the companion wheel, and means for shifting said companion wheel parallel to its axis, substantially as described.

11. In a machine of the nature described, the combination of a pair of rotary shearing wheels whose edges meet, a rotatable wheel support on the axial line of each of said wheels, the support of one of said wheels being movable relative to the machine body in an orbital path around an axis which is coincident with the axis of the companion wheel, and means adjustably engaging the support of the companion wheel and controlled by the operator for moving said support endwise, substantially as described.

12. In a machine of the nature described, the combination of a pair of rotary shearing wheels having meeting edges, a support supporting one of said wheels to allow bodily shifting of said wheel relative to the machine body in an orbital path on an axis coincident with the axial line of the companion wheel and allowing rotation on an axis which is non-coincident with the axis of said companion wheel, said companion wheel having a rotary support which is shiftable endwise, means for limiting the range of said endwise movement, and means controlled by the operator for shifting said support within said range of movement, substantially as described.

13. In a machine of the nature described, a pair of rotary shearing wheels having meeting edges, a turret for supporting one of said wheels, a rotary shaft for supporting the other of said wheels, the axis of said shaft being coincident with the axis of said turret, means on said turret for rotatably supporting the other of said wheels outside of the axial line of the turret and with its edge meeting the edge of the companion wheel, and means in operative relation with said turret and controlled by the operator for turning said turret, substantially as described.

14. In a machine of the nature described, a rotary supporting member, a shearing wheel supported by said supporting member on the axial line of the latter, a turret having its axis coincident with said axial line and comprising a turret body, a base plate on said body, and a shearing wheel supported on said base plate outside of said axial line and with its edge meeting the edge of the first-mentioned shearing wheel, substantially as described.

15. In a machine of the nature described, a rotary supporting member, a shearing wheel supported by said supporting member on the axial line of the latter, a turret having its axis coincident with said axial line and comprising a turret body, a base plate transversely adjustable on said body, and a shearing wheel supported on said base plate outside of said axial line and with its edge meeting the edge of the first-mentioned shearing wheel, substantially as described.

16. In a machine of the nature described, a rotary supporting member shiftable endwise, a shearing wheel supported by said supporting member on the axial line of the latter, a turret having its axis coincident with said axial line and comprising a turret body, a base plate transversely adjustable on said body, and a shearing wheel supported on said base plate outside of said axial line and with its edge meeting the edge of the first-mentioned shearing wheel, substantially as described.

17. In a machine of the nature described, a pair of rotary shearing wheels having meeting edges and having axial lines inclined to each other, one of said wheels having an axial extension concentric to the wheel axis, a rotary support having a recess concentric to its axis and receiving said wheel extension, and a binding member extending through said wheel parallel to the wheel axis and into said supporting member for binding said wheel to said supporting member, substantially as described.

18. In a machine of the nature described, a shearing wheel having one of its sides extending flatwise to the sheet plane, and another shearing wheel located at the opposite side of said sheet plane in position to bring its edge into working engagement with the edge of the first-mentioned wheel, and a turret having its axis in the axial line of the first shearing wheel and supporting the second shearing wheel with its axis non-coincident with said axial line, substantially as described.

19. In a machine of the nature described, the combination of a body comprising a pair of arms, a first shearing wheel supported rotatably on one of said arms, a shearing wheel supporting means supported on the other of said arms for rotation on an axis coincident with the axis of the first wheel, a second shearing wheel supported by said supporting means and having its edge meeting the edge of the first shearing wheel and rotatable on an axis which is non-coincident with the axis of the first shearing wheel, whereby by the rotation of said supporting means the second shearing wheel may be made to move bodily independently of said arms to different points in a path which is concentric to the axis of the first shearing wheel, substantially as described.

In testimony whereof I have signed my name this 6th day of February, in the year one thousand nine hundred and seventeen.

CHARLES BAXTER GRAY.